Jan. 26, 1954 C. E. BEALE ET AL 2,667,541

AUTOMATIC SWITCH FOR USE IN TELEPHONE OR LIKE SYSTEMS

Filed Sept. 11, 1950 3 Sheets-Sheet 1

INVENTORS
Charles Edmund Beale and
Horace Edward Hopley
by Lippincott + Smith
ATTORNEYS Jan. 26, 1954 C. E. BEALE ET AL 2,667,541

AUTOMATIC SWITCH FOR USE IN TELEPHONE OR LIKE SYSTEMS

Filed Sept. 11, 1950 3 Sheets-Sheet 2

INVENTORS
Charles Edmund Beale and
Horace Edward Hopley
by Lippincott + Smith
ATTORNEYS

AUTOMATIC SWITCH FOR USE IN TELEPHONE OR LIKE SYSTEMS

Filed Sept. 11, 1950

3 Sheets-Sheet 3

INVENTORS
Charles Edmund Beale and
Horace Edward Hopley
by Lippincott + Smith
ATTORNEYS Patented Jan. 26, 1954 2,667,541

UNITED STATES PATENT OFFICE 2,667,541

AUTOMATIC SWITCH FOR USE IN TELEPHONE OR LIKE SYSTEMS

Charles Edmund Beale and Horace Edward Hopley, Liverpool, England, assignors to Automatic Telephone & Electric Company Limited, Liverpool, England, a British company Application September 11, 1950, Serial No. 184,192

Claims priority, application Great Britain September 21, 1949

4 Claims. (Cl. 179—18)

Figure 1:
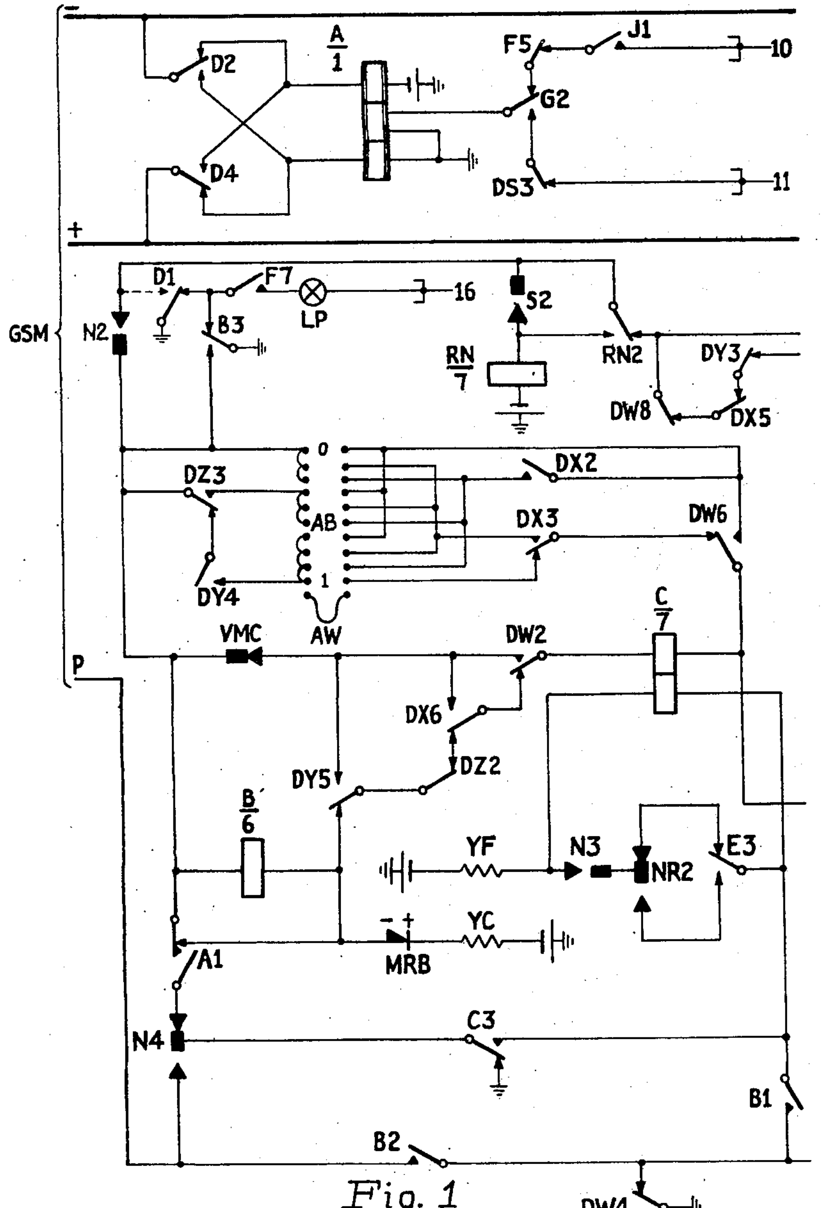

The present invention relates to selector switches for use in automatic telephone systems and is particularly concerned with final selectors of the two directional type providing access to a group or groups of lines terminating on a private branch exchange (P. B. X) or exchanges.

It is well known to employ switch mechanisms of the kind disclosed in British specification No. 391,151 and United States Patent No. 2,124,750 in selectors of the foregoing type, which are known as P. B. X final selectors. Such mechanisms embody two magnets controlling the vertical and rotary movements of the wipers and moreover employ the so-called rectangular release facility. When a P. B. X final selector is taken into use in the setting up of a connection, by dialling the directory number appropriate to the private branch exchange, the selector wipers are initially positioned in such a manner that they are adapted to step successively over outlets corresponding to the P. B. X lines until an idle line is encountered, whereupon the call is extended over that line.

One widely used P. B. X final selector is disclosed in United States Patent No. 2,154,785 and this is designed to serve a maximum of 200 lines derived from the 10 levels of the selector bank, ach level comprising 20 outlets. This selector is primarily intended for establishing connection to private branch exchanges having a comparatively large number of exchange lines and these would be arranged in a plurality of groups having more than 11 lines each or in a single group comprising up to 200 lines. Now in the dialling of the directory number relevant to a required P. B. X group, a final selector of the type mentioned is taken into use over a group selector multiple, and the wipers are then raised under control of the penultimate digit dialled to a level appropriate only to the whole or the first portion of the particular group. The last digit dialled is quite ineffectual and the wipers advance automatically into the bank, testing a pair of lines simultaneously each time the wipers step, until an idle line is encountered whereupon the wipers are arrested and the call is extended to that line. If it occurs that there are 20 or fewer lines in the group these are arranged in a block starting at the first set of contacts on the level which is exclusive to the P. B. X group. In the event of all the lines being busy, when tested, the wipers continue to advance until the 11th position is reached and then busy tone is made audible to the calling party. On the other hand if the number of lines in the P. B. X group exceeds 20, the first 20 are arranged at outlets on the level appropriate to the penultimate digit of the directory number, while the remaining lines are as far as possible terminated in blocks of 20 on other levels, the remainder being connected to the earlier outlets of a final level from which lines of other P. B. X groups are excluded. Thus in the case of the directory number relating to an over 20 line P. B. X group being dialled, the selector wipers are raised under control of the penultimate digit, the final digit is ineffectual as before, and the wipers automatically advance into the bank to search for an idle line in that part of the P. B. X group terminated on the level. If all the outlets on the level are busy, the wipers execute the known rectangular release function, but in passing over the 11th step contacts a prearranged circuit condition matures whereby, after the wipers have returned to the home position they are caused to step vertically to a level determined by code marking relays controlled over the said 11th step contacts. Searching for an idle line then resumes over this second level of the group and may subsequently continue over the remaining levels. Should all the lines in the P. B. X group be busy, the wipers are finally arrested in the 11th position on the last level serving the group, and busy tone is then made audible to the calling party.

Although a P. B. X final selector of the before-mentioned type is suitable for use in most circumstances where comparatively large groups of P. B. X lines are to be served, it nevertheless suffers from certain limitations, and these arise from the single digit control of the wipers. Firstly this type of control interferes with the allocation of lines within the P. B. X group to provide access to so-called night service extensions of the branch exchange, which it would be of advantage to introduce whilst the P. B. X operator is not in attendance. In consequence night service has to be catered for by providing access to separate night service lines by way of regular final selectors. Secondly, when a small number of lines terminate on a level of the P. B. X final selector, for instance the last level of a group, the remaining positions on that level, which may far exceed any likely expansion of the P. B. X group, are wasted. Moreover if a main exchange is converted from manual to automatic working, the use of selectors of the foregoing type would in all probability necessitate the inconvenience of altering the directory numbers relating to the P. B. X groups.

A further improvement has been proposed in

United States Patent No. 2,190,140 in which provision is made for hunting over more than one level, the wipers being set on to the first line of a group in response to two digits. The switch is provided with two sets of wipers but simultaneous testing only takes place on the levels other than the first one tested.

The object of the present invention is to provide a final selector which may be adapted to serve large P. B. X groups and which is an improvement on those described above.

According to one feature of the invention in an automatic switch of the vertical and rotary type, the switch is provided with two sets of wipers which are set on to the first line of a group of lines in response to two digits and hunt for an idle line in the group over a plurality of levels successively, testing taking place simultaneously over both sets of wipers while arrangements are provided to enable the switch to release rectangularly if all lines in one level are unavailable and to be set automatically to hunt over another level over which further lines of the group are accessible.

According to another feature of the invention in an automatic switch of the vertical and rotary type, the switch is arranged so that the wipers are set on to the first line of a group of lines in response to two digits and hunt for an idle line in the group over a plurality of levels successively while if all the lines in the group are unavailable the wipers are stopped on the last line of the group and an individual overflow meter is operated and busy tone returned to the calling party.

According to yet another feature of the invention in an automatic switch of the foregoing type, the setting of the switch on to a line other than the first within a group in response to two digits causes such line alone to be tested for its idle or busy condition, connection being made to the line if it is idle while busy tone is returned to the calling party if it is unavailable.

Figure 2:
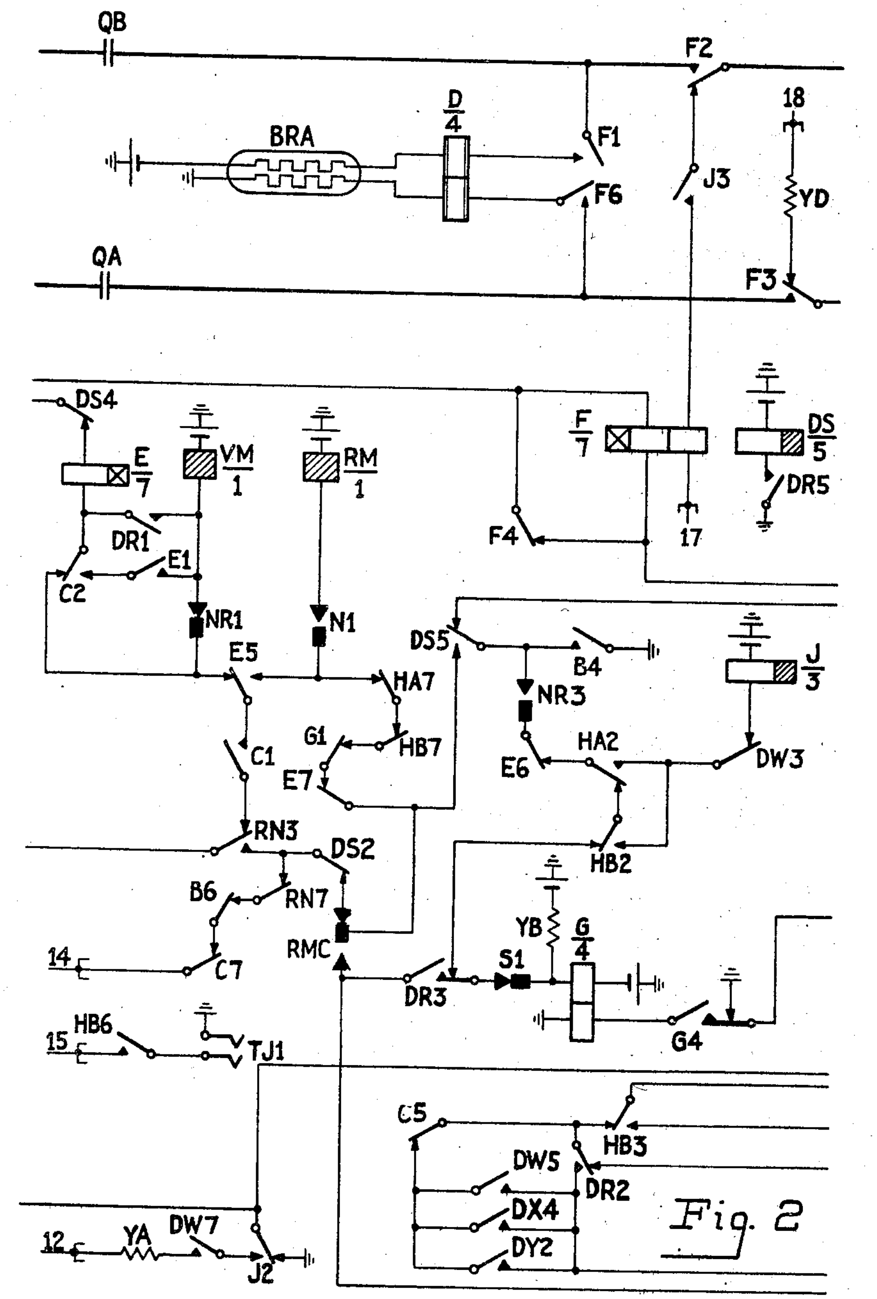
Figure 3:
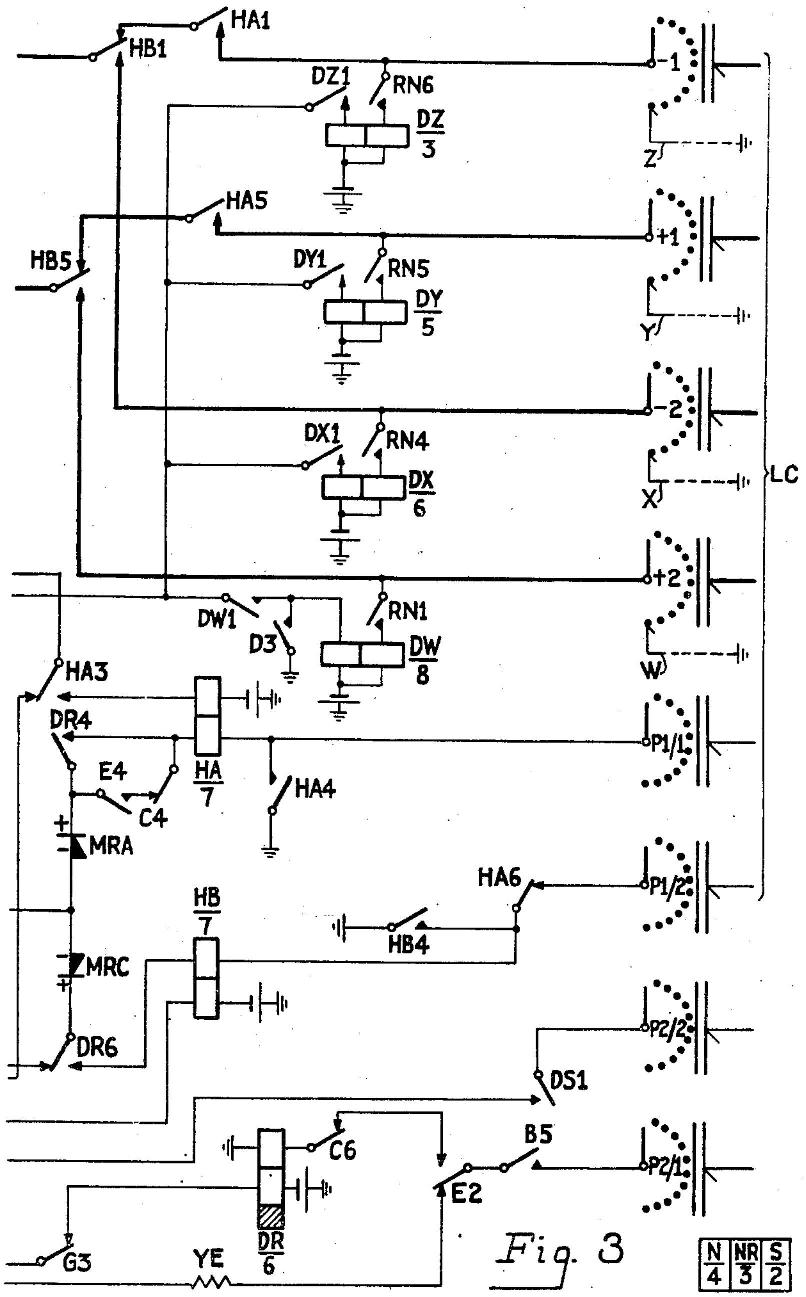

The invention will be better understood from the following description of one method of carrying it into effect and should be read in conjunction with the accompanying drawings comprising Figs. 1 to 3 which should be placed side by side in that order. The drawings show a P. B. X 200 line final selector arranged to test two outlets simultaneously, and employing a mechanism of the type disclosed in British specification No. 391,151 and United States Patent No. 2,124,750.

The selector is taken into use over the appropriate set of contacts in the group selector multiple GSM by the application of a loop to the speech conductors — and +. In this event relay A is operated and its contacts A1 extend earth at contacts C3 to relay B which operates in series with rectifier MRB and resistor YC. Consequently contacts B1 connect earth at contacts DW4 and J2 to relay C which operates over its lower winding in series with resistor YF. At the same time contacts B2 connect earth at contacts DW4 and J2 to the incoming P lead to guard the selector against intrusion, while contacts B3 provide a holding circuit for relay B independently of contacts C3. Relay C in operating at contacts C1 prepares the impulsing path to the vertical magnet VM, and at contacts C3 disconnects the original operating circuit for relay B.

No further circuit changes take place until the first digit, i. e. the penultimate digit of the directory number, is dialled to the selector, whereupon relay A responds by releasing and reoperating an appropriate number of times. Upon each release, contacts A1 apply a short circuit to relay B and also cause the low resistance upper winding of relay G and the vertical magnet VM to be energised from earth over contacts B3, A1, DY5, DZ2, DX6 and DW2, relay C and contacts RN5, C1, E5, NR1 and magnet VM to battery. During the periods of operation of relay A, relay B is again energised in series with resistor YC but the magnet VM and the upper winding of relay C are virtually disconnected. It follows that the vertical magnet is energised a number of times appropriate to the penultimate digit dialled and consequently the selector wipers are raised to the required bank level. Meantime as the wipers leave the normal position the vertical off-normal contacts are mechanically operated, and at contacts N1 prepare the impulsing path to the rotary magnet RM, at contacts N2 prepare to operate relay E, at contacts N3 apply a short circuit to the lower winding of relay C, and at contacts N4 prepare the release guard condition. The intermittent energisation of the low resistance winding of relay C and the application of a sustained short-circuit to the other winding ensures that relay C remains operated throughout the impulse train. Likewise relay B remains operated due to energising and short-circuiting for complementary periods.

At the end of the impulse train relay A remains operated together with relay B, but the upper winding of relay C is de-energised and that relay then releases after a short delay brought about by the short-circuit at the other winding. Upon the release of relay C, contacts C1 disconnect a point in the path to magnet VM, while contacts C2 energise the slow-to-operate relay E over the following circuit: earth, contacts B3, N2, RN2, DW8, DX5, DY3 and DS4, relay E, contacts C2 and NR1 and magnet VM to battery. Relay E operates but the vertical magnet remains inoperative due to the comparatively high resistance of said relay. Relay E in operating, at contacts E1 prepares a self-holding circuit, at contacts E3 removes the short-circuit from the lower winding of relay C so that the latter relay again operates, and at contacts E5 prepares an impulse repeating path for the impulses appropriate to the final digit dialled, to the rotary magnet RM. The opening of contacts E6 prevents the operation of relay G upon the subsequent closure of contacts NR3. When relay C again operates, contacts C1 further prepare the path to magnet RM, contacts C2 disconnect the original operate circuit for relay E while providing an alternative holding circuit over contacts E1, contacts C4 disconnect a point in the path to relay HA, and contacts C6 disconnect a point in the path to relay DR.

When the next digit, being the final digit of the directory number, is dialled to the selector, relay A responds appropriately and relays B and C function in a similar manner to that described. However, the upper winding of relay C is now connected in series with magnet RM by contacts E5, and consequently upon each release of relay A, earth is extended to magnet RM and the selector wipers are caused to take the requisite number of steps into the bank. Meanwhile as the wipers step into the bank the rotary off-normal contacts are mechanically operated, and these, at contacts NR1 prevent subsequent re-completion of the original operate circuit for relay E, at contacts NR2 apply a short circuit to the lower winding of relay C to hold relay C during the impulse train, and at contacts NR3 prepare for the operation of relay G. Upon conclusion of the impulse train, relays A and B are maintained operated whereas relay C is caused to release after a short delay. Relay C again releasing, disconnects the magnet impulsing path, and at contacts C2 disconnects the sluggish relay E. During the period between the release of relay C and the release of relay E an outlet testing condition is extended to the appropriate P1/1 bank contact viz: earth, contacts G4, rectifier MRA, contacts E4 and C4, lower winding of relay HA and wiper P1/1. Also whilst relay E is still operated the upper winding of the slow-to-release relay DR is connected over contacts C6, E2 and B5 to the appropriate contact on bank P2/1.

It is now opportune to mention that the first 10 positions on each level of the selector bank are each separately associated with a pair of outlets which may extend to line circuits LC, the P1/1 and P1/2 wipers providing access to the private wires of the so-called odd and even line circuits respectively. It should also be pointed out at this stage that the location of the P. B. X group in the bank is evidenced by the pre-arrangement of electrical potentials on the P2/1 bank contacts, the first pair of lines being denoted by a resistance battery condition, the last pair by earth, and where the P. B. X exceeds four lines, each intermediate pair by a disconnection. Moreover the P2/2 bank contact appropriate to the last pair of lines in each group is connected to an individual overflow meter extending to battery.

Assume that the dialling of the two digits as described has caused the selector wipers to be set at the start of a P. B. X group. Four possibilities now arise, namely, that wiper P1/1 will encounter the private wire of an idle line and P1/2 the private wire of a busy line, that both wipers will encounter idle lines, that wiper P1/2 will encounter an idle line and wiper P1/1 a busy line, or that both wipers will encounter busy lines.

Consider that the first of the four possibilities arises. The idle condition of the line (odd) accessible over wipers −1 and +1 is evidenced by a resistance battery at the P1/1 bank contact, whereas the busy condition of the partner line (even) accessible over wipers −2 and +2 is denoted by an earth potential at the P1/2 bank contact. It will be remembered that at this instant and for the duration of the release lag of relay E, relays HA and DR are presented to the P1/1 and P2/1 bank contacts respectively. These relays therefore operate, the latter due to the resistance battery condition marking the start of the P. B. X group. Relay HA provides a self-holding circuit over its upper winding from earth by way of contacts B3, N2, RN2, F4 and HA3. Contacts HA1 and HA5 prepare to extend ringing current to wipers −1 and +1, and contacts HA2 prepare to operate relay J. Contacts HA4 apply guarding earth to the private wire of the seized line circuit, while contacts HA6 break the outlet testing path involving relay HB. Contacts HA7 prevent the introduction of a driving circuit to the rotary magnet. Although relay DR operates, a holding path is not provided due to the operation of contacts HA3 so that its retention is dependent upon contacts E2. Contacts DR1 defer the release of relay E for reasons not concerned with the present example, while contacts DR5 operate the slow-to-release relay DS. Contacts DS4 thereupon release relay E and this releases relays DR and DS in turn without them being effective. In addition when relay E releases, contacts E1 prevent its re-operation, contacts E3 allow relay C to re-operate, and contacts E4 disconnect the original path of relay HA. Contacts E5 prevent the false operation of magnet RM, and contacts E6 enable relay J to operate from earth at contacts B4. Relay C now operated for the last time prepares the release guard condition at contacts C3. When relay J operates, contacts J1 connect ringing tone earth from common lead 10 to the middle winding of relay A and consequently the tone is made audible to the calling party in known manner. Contacts J2 prepare the metering circuit, while contacts J3 finally connect ringing current to the seized line by way of wipers −1 and +1 over a path which involves the alternating current source at common lead 17, the right hand winding of the slow-to-operate relay F, resistor YD and the common return lead 18. Relay F of course remains inoperative at this stage but an appropriate calling signal is presented at the private branch exchange.

In the event of the second of the aforesaid possibilities arising when the selector wipers are set at the start of a P. B. X group, namely that wipers P1/1 and P1/2 both encounter idle marking conditions, the odd outlet constitutes the first choice. Consequently the selector functions in precisely the same manner as that described with reference to the first possibility, in that switching is effected by relay HA.

Upon the occurrence of the third before-mentioned possibility, in which wipers P1/1 and P1/2 encounter busy and idle conditions respectively, relay DR operates as already described and is then additionally energised over the lower winding from earth over contacts B3, N2, RN2, F4, HA3, HB3, DR2 and C3. Contacts DR1 prolong the operated period of relay E to ensure that relay DR will remain operated over its original path for a sufficient period to provide for the subsequent operation of relay HB. Contacts DR5 operate relay DS which at contacts DS4 finally allows relay E to release slowly. Contacts DR6 complete the testing circuit for relay HB, from earth over contacts S4, rectifier MRC, contacts DR6, upper winding of relay HB, contacts HA6 and wiper P1/2. Relay HB is therefore operated by the battery condition marking the idle P1/2 bank contact, and self-holds over contacts HB3 to earth at contacts B3. Contacts HB3 moreover in the present case render ineffective the before-mentioned additional circuit of relay DR. Contacts HB1 and HB5 prepare to divert ringing current to the even outlet wipers. Contacts HB2 prepare to operate relay J, while contacts HB4 connect a seizing and guarding earth to the appropriate P1/2 bank contact. Contacts HB3 connect a point in the path to the test trunk bell at common lead 15 so that the insertion of a plug at points TJ1 will provide an audible indication that an even outlet has been employed. Finally contacts HB7 disconnect a point in the path to the rotary magnet. Upon relay E releasing, contacts E2 cause relay DR to release and this is followed by relay DS. Relay E moreover operates relay J which now causes ringing current to be extended to the seized line terminating on the −2 and +2 contacts.

If the last of the before-mentioned possibilities arises namely, that wipers P1/1 and P1/2 both encounter busy conditions, relays HA and HB remain inoperative but relay DR operates as before. Relay DR operating on this occasion, at contacts DR2 provides a self-holding circuit from earth at contacts B3, and at contacts DR3 prepares to operate relay G which is made slightly slow-to-release by the shunt resistor YB. Contacts DR4 maintain the relay HA testing circuit after the subsequent release of relay E. Contacts DR5 operate relay DS, and contacts DR6 provide the usual testing path for relay HB. Relay DS operating, at contacts DS1 prepares for possible overflow metering, at contacts DS2 disconnects a point in one path to magnet RM, at contacts DS3 disconnects the common busy tone lead 11, at contacts DS4 releases relay E, and at contacts DS5 prepares the rotary magnet automatic stepping circuit. The eventual release of relay E, at contacts E3 enables relay C to operate without any immediate effect, at contacts E5 prevents the false operation of magnet RM, and at contacts E6 prepares to hold relay G in the event of all the lines in the P. B. X group being busy. Contacts E7 perform the important function of extending earth at contacts B4 to the rotary magnet, whereupon the selector wipers are advanced to the second position of the group, and the rotary interrupters RMC are actuated. The interrupters complete the operate circuit for relay G as follows: earth, contacts B4, DS5, RMC, DR3 and S1, upper winding of relay G to battery. Relay G operating, at contacts G1 de-energises magnet RM which restores interrupters RMC, at contacts G3 disconnects the hold circuit for relay DR which relay it should be noted is slow-to-release and remains operated during stepping. In addition relay G at contacts G4 introduces the lower (low resistance) winding of relay G into the outlet testing circuits. Since interrupters RMC are again normal at this stage, the original operate circuit of relay G is broken and the subsequent condition of relay G is dependent upon the busy or idle markings now encountered by wipers P1/1 and P1/2.

It may be pointed out that the four previously mentioned possibilities are again operative with respect to the newly encountered pair of outlets. Consequently, if the odd and even outlets are idle and busy respectively, relay HA operates in series with the lower winding of relay G over a path provided by contacts DR4 whilst relay DR is still operated. Relay HA holds and otherwise functions in the manner already described, relay G is caused to release by earth at contacts HA4, and of course relays DR and DS finally release. It should be noted that contacts HA7 opening before contacts G1 restore ensure that the rotary magnet is not re-energised. If both outlets encountered are idle when the wipers attain the said second position, contacts DR4 and DR6 enable relays HA and HB to start to operate over their lower windings in series with relay G. However, the early opening of contacts HA6 decides that only relay HA shall complete the operating function, and consequently the odd line circuit is taken into use over wipers −1, +1 and P1/1. If the odd and even outlets are busy and idle respectively, as evidenced by earth and battery markings at the P1/1 and P1/2 bank contacts, relay HB alone operates and functions after the manner previously described, to extend the call over wipers −2, +2 and P1/2. Furthermore contacts HB7 break the path to magnet RM before contacts G1 close again.

In the event of both lines associated with the said second position of the P. B. X group being busy, relays HA and HB remain inoperative, and since the lower winding of relay G is ineffectual the latter relay releases somewhat earlier than before, so that contacts G3 prevent the release of relay DR. Moreover contacts G1 again energise the rotary magnet to advance the wipers to the next position where any one of the before stated possibilities may obtain. The whole process of advancing the wipers over the bank contacts, a step at a time, and testing the conditions of each pair of outlets encountered, is repetitive until (a) an idle line is found, (b) all the outlets in the P. B. X group have been tested or (c) the wipers reach the 11th set of bank contacts on the level.

If the last-mentioned condition obtains it is indicative of the dialled P. B. X group being continued on at least one other bank level. Consequently it is required that the selector wipers shall execute the so-called rectangular release and then be raised by a level hunting operation to the required continuation level so that searching may again proceed. The operation of the selector under the said circumstances will now be described in greater detail. When the wipers attain the 11th position on a level, the S contacts are mechanically operated. These at contacts S1 prevent the re-operation of relay G, and at contacts S2 operate relay RN from earth over contacts B3. Relay RN self-holds over contacts RN2 which also bring about the release of relay DR. Contacts RN3 prepare the rotary magnet circuit, while contacts RN7 disconnect a point in the path to the release alarm earth at common lead 14. The remaining contacts of relay RN connect the level discriminating relays DW, DX, DY and DZ to wipers +2, −2, +1 and −1 respectively, so that the control of said relays is conditional on the presence or otherwise of earth at the appropriate 11th step contacts designated W, X, Y and Z collectively. Certain of the said contacts on each level may be connected to earth in accordance with the following table, to form a marking code which is to determine the next level setting of the wipers:

| To set at continuation level | 1 | 2 | 3 | 4 | 5 | 6 | 7 | 8 | 9 | 0 |
|---|---|---|---|---|---|---|---|---|---|---|
| Connect earth to | Y | WXY | XY | WY | WXZ | XZ | WZ | WX | X | W |

Consider by way of example that the selector wipers have reached the 11th position on level 4 and that further lines of the P. B. X group are accessible over level 3. In this event contacts X and Y on the former level are connected to earth to enable relays DX and DY to operate. These relays, at contacts DX1 and DY1 prepare self-holding circuits, at contacts DX5 and DY3 prevent subsequent re-operation of relay E, and contacts DX3 and DY4 in combination provide an appropriate marking condition at level 3 of the auxiliary (vertical) bank AB. Contacts DX4 and DY2 prepare to re-operate relay DR, and contacts DX6 prepare a path to the rotary and vertical magnets. At this juncture relay DR, disconnected at contacts RN2, releases and is followed by relay DS. Thereupon relay DS, at contacts DS5 disconnects magnet RM and holds relays DX and DY, and at contacts DS2 further extends the path prepared at contacts DX6. Interrupters RMC are restored upon disconnection of magnet RM, and thereupon said magnet is again energised from earth over contacts B3, vertical magnet interrupters VMC, contacts DX6 and DW2, relay C, contacts RN3, DS2, RMC, E7, G1, HB7, HA7 and N1. The wipers therefore take a 12th rotary step, the mechanically actuated S and NR contacts restore, and the wipers return to the normal position, whereupon the vertical off-normal contacts N restore. It may be noted that magnet RM is de-energised after the wipers have taken the 12th rotary step and is then energised once more due to the release of interrupters RMC. However the rotary magnet armature is mechanically restrained during the latter energisation and as a result interrupters RMC are not actuated again. Meanwhile the release of contacts S1 prepares for the re-operation of relay G. The release of the rotary off-normal contacts, at contacts NR1 prepares a path to magnet VM, and at contacts NR3 prepares to operate relay J or G. Later, the vertical off-normal contacts restoring, at contacts N1 and N2 release the rotary magnet and relay RN respectively. Relay RN then prepares to re-operate relay DR at contacts RN2, and completes a self-interrupted drive circuit to the vertical magnet as follows: earth, contacts B3, interrupters VMC, contacts DX6 and DW2, relay C, contacts RN3, C1, E5 and NR1, and magnet VM to battery. The selector wipers, including the vertical auxiliary wiper AW, are therefore raised in steps until the latter wiper encounters a suitable marking on the vertical bank, the marking in the present example being at level 3. Meantime the vertical off-normal contacts again operate, and these, in addition to various preparatory functions, at contacts N3 short-circuit the lower winding of relay C. The latter relay, which is energised intermittently, over its upper winding in series with magnet VM, during vertical stepping is sustained throughout the period due to the short-circuit at the other winding. However, immediately wiper AW attains position 3, the upper winding of relay C together with interrupters VMC are short-circuited from earth extending over contacts B3, DZ3 and DY4, wiper AW, and contacts DX3 and DW6. Consequently relay C releases, after a short delay, to disconnect permanently the vertical magnet which restores contacts VMC. Relay C also operates relay DR from earth over contacts B3, N2, RN2, F4, HA3, HB3 and C5, contacts DX4 and DY2 in shunt, and contacts G3. Relay DR then self-holds over contacts DR2, prepares to operate relay G, connects points in the outlet testing paths, and operates relay DS. Relay DS is then effective at contacts DS5 in releasing any level discriminating relays which may be operated, relays DY and DX being released in the present example. Contacts DS5 also extend earth at contacts B4 to magnet RM which operates actuates interrupters RMC, and causes the wipers to be set in the first position of level 3. Relays HA and HB then test the pair of outlets so encountered and switching is effected if one of the outlets is idle. On the other hand, if both outlets are busy and other outlets of the same P. B. X group follow, the whole process of searching for an idle line in that portion of the P. B. X group appearing on the continuation level proceeds in the manner already described.

Although only the effect of one level code, i. e. that causing the wipers to be set at level 3, has been described, a perusal of the circuit will show that the discriminating relay or relays, operated in accordance with remaining codes in the table, function in much the same manner as the DX and DY combination of relays. It may be mentioned that, if the lines in the P. B. X group extend over more than two levels, searching over the appropriate levels continues, in the order determined by the condition of the discriminating relays until an idle line is encountered, or until all the lines have been tested.

The operation of the circuit will now be described with reference to the P. B. X operator answering after ringing current has been applied to a seized line. Under these circumstances a direct current loop completed across the outgoing negative and positive conductors causes the ring trip relay F to be energised sufficiently to open the lightly adjusted contacts F4. These contacts remove the short circuit from the left hand winding of relay F, which is thus enabled to operate fully in series with the holding winding of relay HA or HB. Contacts F1 and F6 connect the battery feed relay D to the speaking conductors. Contacts F2 and F3 disconnect ringing current path, permit relay D to operate over the D. C. loop in series with barretter BRA, and moreover provide the talking path between the two parties, over capacitors QA and QB. Contacts F5 disconnect ring tone. Contacts F7 introduce the supervisory lamp LP but relay D immediately disconnects this circuit. Relay D moreover, at contacts D2 and D4 reverses the polarity at the incoming speech conductors for supervisory purposes, while contacts D3 operate relay DW which is then additionally maintained over contacts DW1 to earth at contacts B4. Relay DW is effective at contacts DW3 in allowing relay J to release slowly, and at contacts DW4 and DW7 respectively in removing guarding earth from the incoming P lead and connecting positive battery from common lead 12 over resistor YA to said P lead. Positive battery so connected serves to energise the calling subscriber's meter on locally originated calls and is maintained at the incoming P lead until relay J eventually releases whereupon guarding earth is again connected. Relays A, B, C, D, DW, F and HA or HB remain operated as long as the conversational connection is maintained.

Reference will now be made to the operation of the selector when all the lines in a P. B. X group are found to be busy. It will be remembered that the last bank position of the group, which may be at any point in a level, is marked at the associated P2/1 bank contact by earth, and moreover that the overflow meter relevant to the group is connected to the corresponding P2/2 bank contact. At the instant the last position is encountered the interrupters RMC are actuated, and relay G is therefore operated by them. Relay G holds from the aforesaid earth at the P2/1 bank contact and extending over contacts B5 and E2, resistor YE, and contacts DR3 and S1. Relay G, at contacts G1 prevents further energisation of the rotary magnet, at contacts G2 prepares to connect busy tone earth, at contacts G3 allows relay DR to release slowly, and at contacts G4 temporarily maintains the outlet testing paths, but since an idle line is not encountered relays HA and HB remain inoperative. Upon the eventual release of relay DR, contacts DR2 energise the overflow meter, from earth over contacts B3, N2, RN2, F4, HA3, HB3, DR2 and DS1. Contacts DR3 disconnect the original hold circuit of relay G and substitute another involving earth at contacts B4. Relay DR also disconnects the outlet testing paths and permits relay DS to release. The latter relay then disconnects the overflow meter at contacts DS1 so that the overflow condition is recorded, and at contacts DS3 makes busy tone audible to the calling party by connecting the common tone earth lead 11.

It may be mentioned that when an idle line is encountered at the last position of the P. B. X group, relay G temporarily holds to earth at the P2/1 bank contact but either relay HA or HB operates and is duly followed by the release of relays DR, G and GS in that order, the release of relay G being finally effected at contacts HA2 or HB2. Contacts HA3 or HB3 prevent overflow metering, and contacts G2 disconnect the busy tone earth path before contacts DS3 restore. In other respects the circuit functions in precisely the same manner as when any other outlet is seized.

The selector caters for night service facilities by way of all or any of the odd lines, except the first, in the P. B. X group. For instance if the P. B. X group extends over bank positions 45 to 55 (20 lines), nine lines may be made available for such purposes, and these would be separately accessible by dialling the appropriate two digits in the range 46 to 55. Thus if "46" is dialled to the selector, the wipers are set accordingly in a position which is not marked by a battery potential at the P2/1 bank contact. Consequently relay DR does not operate upon the release of relay C, and it follows that a single outlet testing path involving relay HA and wiper P1/1 is presented during the release lag of contacts E4. If the dialled night service line is idle relay HA operates and the selector completes the connection in a manner already described. When a dialled night service line is busy relay HA remains normal, and relay G permanently operates, when relay E releases, from earth at contacts B4. Relay G prevents further energisation of the rotary magnet, and causes busy tone to be made audible to the calling party.

Access to subscribers' stations served by single lines is provided by the selector, but this involves the inevitable wastage of the relevant even outlets. Such single lines are not marked on the P2/1 bank, and when they are dialled the selector functions in a like manner to that described with reference to night service facilities.

The release of the selector after a call will now be described, first assuming that the release is controlled by the calling party as evidenced by the omission of the dotted connection at contacts D1. When the calling party clears first relays A and B release in turn. Contacts B1 and B2 disconnect relay C, and moreover temporarily remove earth from the incoming P lead to release the preceding equipment. Contacts B3 release relays F and HA or HB, while contacts B4 disconnect one path to relay DW. Contacts B5 disconnect wiper P2/1, and contacts B6 connect a point in the path to the release alarm earth lead 14. Relay C releases immediately after relay B and contacts C3 introduce the release guard condition over operated contacts N4. Additionally relay C releasing, and in conjunction with relay HA or HB, causes the self-interrupted drive circuit for the rotary magnet to be completed from release alarm earth at lead 14, contacts C7, B6, RN7 and DS2, interrupters RMC, contacts E7 and so on. The so-called rectangular release of the wipers is consequently effected and the vertical off-normal contacts finally release at the home position. Meanwhile relay D is released by relay HA or HB, and this brings about the release of relay DW. The vertical off-normal contacts releasing, at contacts N1 disconnect magnet RM, and at contacts N4 remove the guarding earth from the P lead. Thus the selector is conditioned so as to be ready to be taken into use on another call. It may be mentioned that should the wiper carriage fail to return to normal due to a mechanical defect the permanent energisation of magnet RM from release alarm earth causes an alarm to be presented in known manner. If the called party clears first relay D alone releases, so that contacts D1 light the supervisory lamp LP and initiate a delayed audible alarm condition over common lead 16.

The selector may be arranged for last party release by including the dotted connection at contacts D1 to provide an additional holding circuit for relays F and HA or HB. The clearance of the calling partly releases relays A, B and C as before and again a brief unguard of the private, during the release lag of relay C, provides for the release of the equipment preceding the selector. However relays D, DW, F and HA or HB remain operated until the called party clears, and thereupon the selector returns to normal. If either party fails to clear, contacts D1 or B3 cause lamp LP to light and a delayed alarm to be given.

We claim:

1. In an automatic switching apparatus comprising a plurality of levels of bank contacts, a group of lines terminating in adjacent contacts on different levels, two sets of wipers, an impulse-responding device, means for operating said wipers to one of said levels in response to the reception of a first train of impulses by said impulse-responding device, means for operating said wipers to the first of the adjacent contacts in said one level in response to the reception of a second train of impulses by said impulse-responding device, means for automatically operating said wipers in a step-by-step action, means effective during said step-by-step action for testing simultaneously over both sets of wipers the conditions of the lines accessible through said adjacent contacts, switching means operable when all lines connected to the adjacent contacts in one level test busy, means responsive to the operation of said switching means for returning said wipers to their normal position and resetting means for automatically operating said wipers on to the first of the adjacent contacts in another level.

2. Automatic switching apparatus as claimed in claim 1 including, in addition, means responsive to the directive setting of said wipers on an intermediate line of the group for preventing the operation of said switching devices so that said restoring means and said resetting means are prevented from operating.

3. Automatic switching apparatus comprising levels of bank contacts, a group of lines terminating in adjacent contacts on different levels, a set of wipers, a first source of potential of one polarity connected to a contact accessible to one of said wipers and corresponding to the first line of the group, a second source of potential of opposite polarity connected to a contact accessible to said wiper and corresponding to the last line of said group, an impulse-responding device, means for operating said wipers to one of said levels in response to the reception of a first train of impulses by said impulse-responding device, means for operating said wipers to the first of the adjacent contacts in said one level in response to the reception of a second train of impulses by said impulse-responding device, a first switching device operated over said wiper from said first source of potential, means responsive to the operation of said switching device for automatically operating said wipers in a step-by-step action to test the condition of the lines connected to said adjacent contacts in said one level, first and second switching means operable in the event that all said lines accessible to said adjacent contacts test busy during the step-by-step operation of said wipers, means for restoring said wipers to their normal position in response to the operation of said first switching means, means for resetting said wipers on to the first one of adjacent contacts on a different one of said levels in response to the operation of said second switching means, a second switching device operated over said wiper from said second source of potential and means responsive to the operation of said second switching device for terminating said hunting operation and for transmitting busy tone.

4. Automatic switching opparatus as claimed in claim 3 including, in addition, an overflow meter connected to a contact accessible to a second wiper and corresponding to the last line of the group and means responsive to all lines in the group test busy during said step-by-step action for completing a circuit for said overflow meter over said second wiper.

CHARLES EDMUND BEALE.
HORACE EDWARD HOPLEY.

References Cited in the file of this patent

UNITED STATES PATENTS

| Number | Name | Date |
|---|---|---|
| 1,556,987 | Christian | Oct. 13, 1925 |
| 1,603,929 | Wicke | Oct. 19, 1926 |
| 1,631,506 | Sipe | June 7, 1927 |
| 1,638,513 | Stehlik | Aug. 9, 1927 |
| 1,667,950 | Ruggles | May 1, 1928 |
| 1,674,677 | Bascom | June 26, 1928 |
| 1,694,623 | Ostline | Dec. 11, 1928 |
| 1,716,986 | Stehlik | June 11, 1929 |
| 1,812,999 | Taylor et al. | July 7, 1931 |
| 2,419,282 | Ostline | Apr. 22, 1947 |